United States Patent Office 3,664,547
Patented May 23, 1972

3,664,547
ARTICLE FEEDING MECHANISM
Raymond J. Dwyer, 4737 Secor Road,
Toledo, Ohio 43623
Filed May 12, 1970, Ser. No. 36,606
Int. Cl. B65g 59/00
U.S. Cl. 221—259
2 Claims

ABSTRACT OF THE DISCLOSURE

A rapid feeder of articles, such as nuts, in which, by the use of a rotating disc, the articles are arranged in a row and when a predetermined number has been reached, a stop plunger is actuated to prevent feeding additional articles to such row and another stop plunger at the outlet end retracts to discharge those articles in the group. Both the feeding and discharge of the articles is accomplished speedily by the same rotating disc. After a group of articles is discharged, the stop plungers are again actuated, one to prevent the discharge of articles, and the other to admit articles to form the group.

SUMMARY OF THE INVENTION

The recurrent delivery of a predetermined number of articles speedily and accurately has not been satisfactorily achieved by a simple and inexpensive machine. Oftentimes it is desired to package a definite number of articles, such for example as nuts, and this must be done rapidly to make the operation economical. Many machines have been designed for this purpose, but they have not been entirely satisfactory because they are too complicated and costly, and cannot be readily changed so as to discharge a larger or smaller number of articles.

This invention provides an exceedingly simple and efficient machine for feeding an equal number of articles recurrently, as for example, into containers so that a series of filled containers may be provided each containing the same number of articles. The machine can be simply adjusted to increase or decrease the number of articles fed from time to time, and this can be achieved quickly and without great know how. A particular feature of the machine is the speed by which the articles can be grouped and then discharged.

DESCRIPTION OF THE PREFERRED EMBODIMENT

Figure 1:
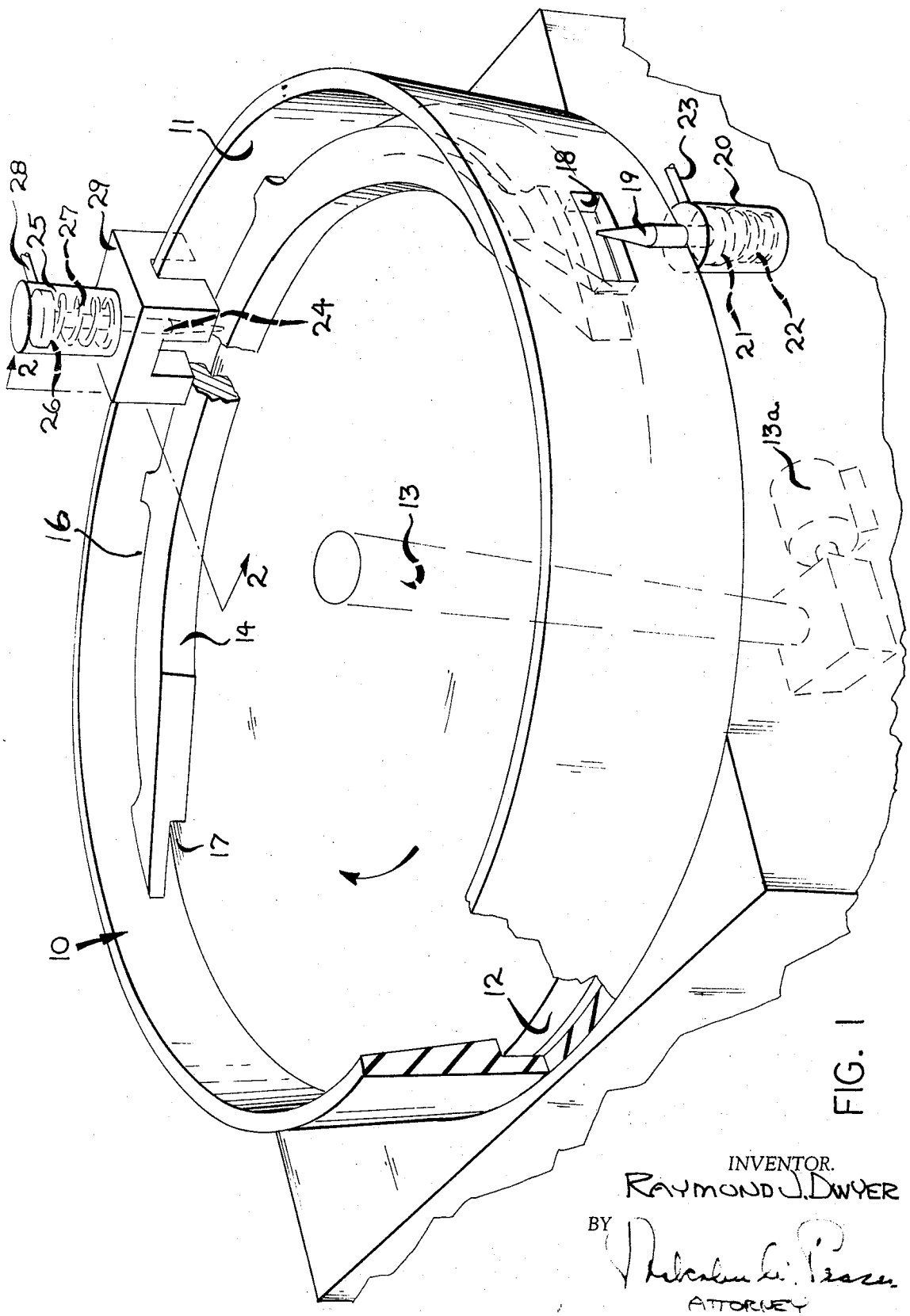
FIG. 1 is a top perspective view of the article feeding mechanism, parts being broken away for the purpose of clarity.
Figure 2:
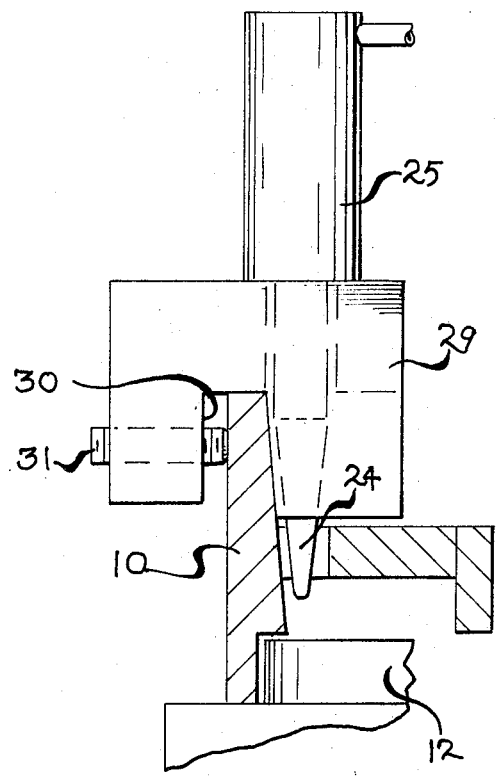
FIG. 2 is an enlarged sectional view substantially on the line 2—2 of FIG. 1.

The illustrated embodiment of the invention comprises a hopper 10 into which the articles can be fed in predetermined manner, and discharged in any suitable manner. The hopper 10 has an upstanding cylindrical wall 11, the bottom edge of which is recessed to receive a flat circular disc 12. The disc 12 is rapidly rotated and, as shown, it has a depending drive shaft 13 which is suitably connected to be driven by an electric motor 13a. The centrifugal force created by the disc 12 throws the articles against the wall 11, and thence to the inlet opening hereinafter described.

Along a portion of the inside wall of the hopper cylinder is an arcuate channel formed by a vertical arcuate wall 14, spaced inwardly from the inner wall of the hopper cylinder 11; and a top wall 15, which has a series of sight openings 16 therein. It will be understood that the bottom of the arcuate channel above described is formed by the rotating disc 12 so that articles in such channel are rapidly moved in response to the movement of the disc.

The arcuate channel has an inlet opening 17 into which articles, such for example as nuts, are forced by the rapid rotating movement of the disc 12. The opening 17 is formed to fit the particular articles being handled. At the opposite end of the arcuate channel is an outlet 18, which may have a spout-like projection so that the articles may be rapidly impelled therefrom.

The outlet 18 is normally closed by a pointed stop plunger 19 which reciprocates within a cylinder 20. The plunger 19 has a piston 21 movable within the cylinder, and for holding the plunger in stop position a coil spring 22 within the cylinder urges the piston upwardly so that the plunger 19 is properly disposed. The cylinder 20 is suitably mounted below the outlet 18, and disposed in the upper end of the end portion of the cylinder is a tube 23 for receiving pressure fluid to retract the plunger when it is desired to discharge articles from the arcuate channel.

A stop plunger 24 is provided for controlling the movement of articles within the arcuate channel. The arcuate channel is filled with articles delivered by action of the disc 12 and when a group of articles is to be discharged, then the plunger 24 is actuated to enable articles in advance of it to be discharged and hold those in rear against further advance. At the time that the plunger 24 moves to its blocking position, then the outlet plunger 19 retracts so that the disc 12 operates abruptly to throw the articles disposed within the arcuate channel between the two plungers from the hopper through the outlet 18. The inlet stop plunger 24 has a cylinder 25 above it in which a piston 26 reciprocates, the plunger being connected to the piston. Between the piston 26 and the bottom of the cylinder is a coil spring 27 which normally urges the piston upwardly to move the stop plunger to its retracted or inoperative position.

A tube 28 connects to the upper end of the cylinder 25 for feeding pressure fluid thereto in order to advance the piston against the force of the coil spring 27 to move the plunger to its operative position. The cylinder 25 and associated parts are carried by a mounting slide 29 which is formed with a groove 30 enabling the mounting slidingly to fit the upper edge of the cylinder wall 11. This enables the mounting and associated parts to be shifted manually from one position to another so that the group of articles in the arcuate channel may be increased or decreased. This can be readily effected as the sight openings 16 enable the operator to determine just how many articles are disposed in the channel to be discharged at one time. After the slide has been moved to the appropriate position, it is tightened in place by a set screw 31.

Any suitable valve means may be employed for automatically introducing pressure fluid to the plunger cylinders 20 and 25. Manifestly, the plungers operate so that the outlet plunger 19 is retracted or moved downwardly at the same time the inlet plunger 24 is advanced to blocking position. At that time, all of the articles disposed between the two plungers are abruptly discharged due to the rapid rotating movement of the disc 12. So soon as the articles have been discharged, then the outlet plunger 19 is moved into its operative or stop position, and the inlet plunger 24 is retracted to enable an additional number of articles to be fed into the arcuate channel. Manifestly, the operation of the plungers is automatically operated in timed relation by mechanisms or control valves well known in the art.

What I claim is:
1. A machine for recurrently feeding a predetermined number of articles comprising
    a hopper having a cylindrical side wall, a disc rapidly rotating on a vertical axis and constituting the bottom wall of said hopper, means providing an open ended arcuate channel about a portion of said cylindrical side wall adapted to receive a row of articles thrown therein by centrifugal force of said disc which also provides a bottom for said channel, there being an outlet opening to enable articles to be discharged from said channel, means providing a retractable stop plunger controlling the movement of articles in said channel and comprising a slide carrying said plunger and shiftable manually along the periphery of said side wall for increasing or reducing the number of articles in such row, a vertical groove in said slide for receiving the rim of said cylinder for sliding movements between the ends of said channel, thereby to predetermine the number of articles in said channel, means providing a retractable stop plunger for the outlet end of said channel, and means individual to each stop plunger for operating same concomitantly, whereby when said inlet stop plunger is retracted and said outlet stop plunger is in operative blocking position a row of articles is formed in said channel in rear thereof by said disc, and when said inlet stop plunger is in operative position and said outlet stop plunger is retracted the row of articles formed in said channel is abruptly discharged from said hopper by action of said disc.

2. A machine as claimed in claim 1, comprising a piston on the outer end of each plunger, a cylinder for each piston, means for introducing pressure fluid to each cylinder, and a coil spring for retracting each piston.

References Cited

UNITED STATES PATENTS

| 3,133,670 | 5/1964 | Heyer | 221—296 X |
| 2,665,005 | 1/1954 | Mundy | 221—167 X |

FOREIGN PATENTS

| 1,326,994 | 4/1963 | France | 221—167 |

JOSEPH WEGBREIT, Primary Examiner

H. S. LANE, Assistant Examiner

U.S. Cl. X.R.

221—298